United States Patent
Kuelbs

(10) Patent No.: US 8,794,781 B2
(45) Date of Patent: Aug. 5, 2014

(54) UMBRELLA APPARATUS

(75) Inventor: Gregory G. Kuelbs, Westlake, TX (US)

(73) Assignee: World Factory, Inc., Westlake, TX (US)

( * ) Notice: Subject to any disclaimer, the term of this patent is extended or adjusted under 35 U.S.C. 154(b) by 886 days.

(21) Appl. No.: 10/650,537

(22) Filed: Aug. 28, 2003

(65) Prior Publication Data

US 2004/0149325 A1 Aug. 5, 2004

Related U.S. Application Data

(63) Continuation of application No. 10/068,424, filed on Feb. 7, 2002, now Pat. No. 6,612,713.

(60) Provisional application No. 60/267,018, filed on Feb. 7, 2001, provisional application No. 60/335,933, filed on Nov. 2, 2001.

(51) Int. Cl.
*A45B 3/02* (2006.01)
(52) U.S. Cl.
USPC .......................................... 362/102; 362/577
(58) Field of Classification Search
USPC ............. 362/102, 96, 209, 276, 577, 20, 159, 362/182, 183, 194, 227, 278, 319, 320, 352, 362/431, 450, 800; 135/16, 15.1, 16.22
See application file for complete search history.

(56) References Cited

U.S. PATENT DOCUMENTS

| | | | |
|---|---|---|---|
| 2,863,466 A * | 12/1958 | Small | 135/20.3 |
| 2,960,094 A * | 11/1960 | Small | 135/22 |
| 3,129,715 A | 4/1964 | Militano et al. | |
| 3,801,809 A | 4/1974 | Slade | |
| 3,878,387 A | 4/1975 | Kovacic | |
| 4,346,606 A | 8/1982 | Cannon et al. | |
| 4,540,929 A | 9/1985 | Binkley et al. | |
| 4,893,356 A | 1/1990 | Waters | |
| 4,920,897 A | 5/1990 | Reed et al. | |
| 5,053,931 A * | 10/1991 | Rushing | 362/102 |
| 5,055,984 A | 10/1991 | Hung et al. | |
| 5,116,258 A | 5/1992 | Vennik | |
| 5,126,922 A | 6/1992 | Andreasen | 362/32 |
| 5,141,010 A | 8/1992 | Muller et al. | |

(Continued)

FOREIGN PATENT DOCUMENTS

| | | |
|---|---|---|
| JP | 9-168415 | 6/1997 |
| JP | 09168415 | 6/1997 |
| WO | WO 93/00840 A1 | 1/1993 |

OTHER PUBLICATIONS

U.S. Appl. No. 11/199,956 titled "Umbrella Apparatus" filed Aug. 9, 2005.

(Continued)

*Primary Examiner* — Hargobind S Sawhney
(74) *Attorney, Agent, or Firm* — James E. Walton

(57) ABSTRACT

A lawn or patio umbrella with an integral lighting system that utilizes cold cathode ray tubes, light emitting diodes (LED's), or florescent lights, to provide relatively bright outdoor light for reading and other activities that require relatively high light intensities is provided. In one embodiment, a modular, electrically powered lawn or patio umbrella in which lighting systems, such as those utilizing cold cathode tubes, LED's, or florescent lights; cooling systems, such as those utilizing electric fans or misting systems; and motorized retraction systems; can be selectively interchanged is provided.

10 Claims, 11 Drawing Sheets

(56) References Cited

U.S. PATENT DOCUMENTS

| | | | | |
|---|---|---|---|---|
| 5,172,711 | A | 12/1992 | Mueller et al. | 135/16 |
| 5,217,296 | A | 6/1993 | Tanner et al. | |
| 5,273,062 | A | 12/1993 | Mozdzanowski | 135/16 |
| 5,349,975 | A | 9/1994 | Valdner | 135/16 |
| 5,373,287 | A | 12/1994 | Doublet | |
| 5,463,536 | A | 10/1995 | Chou et al. | 362/102 |
| 5,502,624 | A | 3/1996 | Tu | |
| 5,584,564 | A | 12/1996 | Phyle | 362/102 |
| 5,611,614 | A | 3/1997 | Morgan | |
| 5,664,874 | A * | 9/1997 | Winterer | 362/191 |
| 5,758,948 | A | 6/1998 | Hale | |
| 5,819,455 | A | 10/1998 | Tsuda | |
| 5,911,493 | A * | 6/1999 | Walker et al. | 362/102 |
| 5,937,882 | A | 8/1999 | Harbaugh | |
| 5,954,417 | A * | 9/1999 | Mai | 362/102 |
| 5,957,717 | A | 9/1999 | Monsef et al. | |
| 6,017,188 | A | 1/2000 | Benton | 416/5 |
| 6,058,951 | A | 5/2000 | Wilson | |
| 6,089,727 | A * | 7/2000 | Wu | 362/102 |
| 6,126,293 | A * | 10/2000 | Wu | 362/102 |
| 6,182,917 | B1 | 2/2001 | Lai | |
| 6,196,242 | B1 | 3/2001 | Xu | |
| 6,270,230 | B1 * | 8/2001 | Mai | 362/102 |
| 6,280,874 | B1 | 8/2001 | Hensley et al. | |
| 6,298,866 | B1 * | 10/2001 | Molnar, IV | 135/16 |
| 6,299,325 | B1 * | 10/2001 | Cathel | 362/183 |
| 6,341,873 | B1 * | 1/2002 | Yang | 362/102 |
| 6,406,163 | B1 | 6/2002 | Yang | |
| 6,439,249 | B1 * | 8/2002 | Pan et al. | 135/16 |
| 6,499,856 | B2 * | 12/2002 | Lee | 362/102 |
| 6,612,713 | B1 | 9/2003 | Kuelbs | |
| 6,666,224 | B2 * | 12/2003 | Lee | 135/16 |
| 6,729,742 | B2 | 5/2004 | Wismeth et al. | |
| 7,051,744 | B2 | 5/2006 | Hung | |
| 7,188,633 | B2 | 3/2007 | Zerillo | |
| 7,753,546 | B2 | 7/2010 | Kuelbs | |
| 8,069,868 | B2 | 12/2011 | Kuelbs | |
| 8,375,966 | B2 | 2/2013 | Kuelbs | |
| 2002/0078985 | A1 * | 6/2002 | Farr | 135/16 |
| 2004/0031510 | A1 | 2/2004 | Li | |
| 2004/0149325 | A1 | 8/2004 | Kuelbs | |
| 2005/0072451 | A1 | 4/2005 | Vivian et al. | |
| 2006/0005869 | A1 | 1/2006 | Kuelbs | |
| 2012/0325278 | A1 | 12/2012 | Kuelbs | |

OTHER PUBLICATIONS

U.S. Appl. No. 10/829,790 titled "Umbrella Apparatus" filed Apr. 22, 2004.
U.S. Patent Reexamination Control No. 95/000,104 for U.S. Patent No. 6612713.
Office Action dated Jan. 13, 2010 from U.S. Appl. No. 12/240,845.
Action Closing Prosecution dated Dec. 18, 2009 from 95/000,104.
Amendment dated Jan. 18, 2010 from 95/000,104.
Decision on Petitions dated Mar. 1, 2010 from 95/000,104.
Decision Dismissing Petition dated Mar. 1, 2010 from 95/000,104.
Action Closing Prosecution dated Mar. 2, 2010 from 95/000,104.
Response to Action Closing Prosecution dated Mar. 9, 2010 from 95/000,104.
Notice of Allowance dated Mar. 9, 2010 from U.S. Appl. No. 12/255,255.
Appeal Decision Dated Jul. 25, 2013 from U.S. Appl. No. 11/199,956.
Issue Notice Dated Feb. 19, 2013 from U.S. Appl. No. 13/311,887.
Examiners Amendment Dated Aug. 27, 2013 from 95/000,104.
Notice to Issue Reexamination Certificate Dated May 14, 2013 from 95/000,104.
Litigation Search Report Dated Apr. 17, 2013 from U.S. Appl. No. 13/311,887.
Response to Office Action Dated Feb. 4, 2013 from U.S. Appl. No. 13/607,911.
Notice of Publication Dated Dec. 27, 2012 from U.S. Appl. No. 13/607,911.
Office Action Dated Apr. 15, 2013 from U.S. Appl. No. 13/607,911.
Amendment After Final Dated Jun. 17, 2013 from U.S. Appl. No. 13/607,911.
Advisory Action Dated Jul. 3, 2013 from U.S. Appl. No. 13/607,911.
RCE and Amendment under 37CFR1.114 Dated Sep. 16, 2013 from U.S. Appl. No. 13/607,911.
Office Action Dated Sep. 27, 2013 from U.S. Appl. No. 13/607,911.
Interview Summary dated Apr. 5, 2010 from corresponding U.S. Appl. No. 12/240,845.
Amendment dated Apr. 9, 2010 from corresponding U.S. Appl. No. 12/240,845.
Final Office Action dated Jul. 6, 2010 from corresponding U.S. Appl. No. 12/240,845.
Request for Continued Examination and Amendment under 37 CFR 1.114 dated Nov. 4, 2010 from corresponding U.S. Appl. No. 12/240,845.
Non-Final Office Action dated Dec. 15, 2010 from corresponding U.S. Appl. No. 12/240,845.
Notice of Publication Dated Mar. 29, 2012 from U.S. Appl. No. 13/311,887.
Amendment Date Apr. 18, 2012 from U.S. Appl. No. 13/311,887.
Office Action Dated Aug. 3, 2012 from U.S. Appl. No. 13/311,887.
Office Action Dated Nov. 2, 2012 from U.S. Appl. No. 13/607,911.
Filing Receipt Dated Sep. 21, 2012 from U.S. Appl. No. 13/607,911.
Notice of Allowance Dated Oct. 17, 2012 from U.S. Appl. No. 13/311,887.
Amendment After Final Dated Oct. 3, 2012 from U.S. Appl. No. 13/311,887.
Appeal Decision Dated Jan. 10, 2013 from 95/000,104.
Specification dated Feb. 7, 2002 from U.S. Appl. No. 10/068,424.
Office Action dated Dec. 9, 2002 from U.S. Appl. No. 10/068,424.
Amendment dated Feb. 17, 2003 from U.S. Appl. No. 10/068,424.
Notice of Allowance dated Jun. 20, 2003 from U.S. Appl. No. 10/068,424.
Amendment dated Jun. 3, 2003 from U.S. Appl. No. 10/068,424.
Issue Notification dated Sep. 2, 2003 from U.S. Appl. No. 10/068,424.
Specification dated Feb. 7, 2002 from 95/000,104.
Request for Reexamination dated Sep. 2, 2003 from 95/000,104.
Notice of Assignment dated Aug. 12, 2005 from 95/000,104.
Decision for Granting Reexamination dated Sep. 28, 2005 from 95/000,104.
First Office Action dated Oct. 3, 2005 from 95/000,104.
Response to Order Granting Reexamination dated Nov. 8, 2005 from 95/000,104.
Notice to Correct Papers dated Dec. 5, 2005 from 95/000,104.
Response to Notice to Correct Papers dated Dec. 12, 2005 from 95/000,104.
Requester's Comments dated Dec. 15, 2005 from 95/000,104.
Requester's Comments dated Jan. 16, 2006 from U95/000,104.
Second Office Action dated Dec. 5, 2006 from 95/000,104.
Declaration dated Feb. 5, 2007 from 95/000,104.
Response to Second Office Action dated Feb. 5, 2007 from 95/000,104.
Requester's Response to Second Office Action dated May 7, 2007 from 95/000,104.
Notice to Correct Papers dated Jul. 25, 2008 from 95/000,104.
Response to Notice to Correct Papers dated Aug. 21, 2008 from 95/000,104.
Notice to Correct Papers dated Mar. 20, 2009 from 95/000,104.
Requester's Change of Address dated May 31, 2009 from 95/000,104.
Response to Notice to Correct Papers dated Apr. 17, 2009 from 95/000,104.
Requester's Response dated May 18, 2009 from 95/000,104.
Office Action Rejecting Requester's Response dated Aug. 28, 2009 from 95/000,104.
Requester's Replacement Comments dated Sep. 16, 2009 from 95/000,104.
Office Action Expunging Requester's Comments dated Oct. 22, 2009 from 95/000,104.

(56) References Cited

OTHER PUBLICATIONS

Petition Under 37 CFR 1.181 to Find the Third Party Requester's Replacement Comments in Compliance with 37 CFR 1.948 dated Nov. 16, 2009 from 95/000,104.
Petition Under 37 CFR 1.181 to Enter the Third-Party Requester's Replacement Comments on the Basis of the Examiner's Noncompliance with MPEP 2617 dated Nov. 16, 2009 from 95/000,104.
Petition Under 37 CFR 1.181 to Enter Third Party Requester's Replacement Comments for Failure of the Examiner to Comply with MPEP 2667 dated Nov. 16, 2009 from 95/000,104.
Petition Under 37 CFR 1.183 to Suspend the Rules with Respect to the 50-page Limit for Requester's Comments dated Nov. 16, 2009 from 95/000,104.
Petition Under 37 CFR 1.181 to Enter Third Party Requester's Replacement Comments Because the 50-page Limit has Been Properly Met dated Nov. 16, 2009 from 95/000,104.
Specification dated Oct. 21, 2008 from U.S. Appl. No. 12/255,255.
Notice to File Missing Parts dated Nov. 7, 2008 from U.S. Appl. No. 12/255,255.
Response to File Missing Parts dated Nov. 19, 2008 from U.S. Appl. No. 12/255,255.
Publication dated Mar. 5, 2009 from U.S. Appl. No. 12/255,255.
Non-Final Office Action dated Aug. 7, 2009 from U.S. Appl. No. 12/255,255.
Amendment dated Nov. 6, 2009 from U.S. Appl. No. 12/255,255.
Amendment dated Apr. 18, 2012 from corresponding U.S. Appl. No. 13/311,887.
Non-Final Office Action dated Jan. 18, 2012 from corresponding U.S. Appl. No. 13/311,887.
Amendment dated Apr. 12, 2011 from corresponding U.S. Appl. No. 12/240,845.
Issue Notification from corresponding U.S. Appl. No. 12/240,845.
Notice of Allowance from corresponding U.S. Appl. No. 12/240,845.
Examiner's Answer dated Sep. 20, 2011 from corresponding 95/000,104.
Right of Appeal Notice dated Jan. 12, 2011 from corresponding Patent Reexamination Application/Control No. 95/000,104.
Notice of Appeal of Third Party Requester dated Feb. 10, 2011 from corresponding Patent Reexamination Application/ Control No. 95/000,104.
Appeal Brief of Appellant Third Party Requester dated Apr. 8, 2011 from corresponding Patent Reexamination Application/Control No. 95/000,104.
Specification dated Apr. 22, 2008 from U.S. Appl. No. 10/829,790.
Notice to File Missing Parts dated Jun. 30, 2004 from U.S. Appl. No. 10/829,790.
Response to File Missing Parts dated Aug. 24, 2004 from U.S. Appl. No. 10/829,790.
Preliminary Amendment dated Feb. 23, 2005 from U.S. Appl. No. 10/829,790.
Restriction Requirement dated Mar. 15, 2006 from U.S. Appl. No. 10/829,790.
Response to Restriction Requirement dated Aug. 21, 2006 from U.S. Appl. No. 10/829,790.
Non-Final Office Action dated Nov. 7, 2006 from U.S. Appl. No. 10/829,790.
Declaration dated Apr. 3, 2007 from U.S. Appl. No. 10/829,790.
Amendment dated Apr. 3, 2007 from U.S. Appl. No. 10/829,790.
Non-Final Office Action dated Jul. 23, 2007 from U.S. Appl. No. 10/829,790.
Amendment dated Jan. 23, 2008 from U.S. Appl. No. 10/829,790.
Final Office Action dated Mar. 27, 2008 from U.S. Appl. No. 10/829,790.
Notice of Abandonment dated Dec. 15, 2008 from U.S. Appl. No. 10/829,790.
Specification dated Feb. 7, 2007 from U.S. Appl. No. 11/199,956.
Preliminary Amendment dated Aug. 9, 2005 from U.S. Appl. No. 11/199,956.
Request for Continuation Application dated Aug. 9, 2005 from U.S. Appl. No. 11/199,956.
Notice to Correct Application Papers dated Sep. 2, 2005 from U.S. Appl. No. 11/199,956.
Reply to Notice to Correct Application Papers Sep. 15, 2005 from U.S. Appl. No. 11/199,956.
Publication dated Jan. 12, 2006 from U.S. Appl. No. 11/199,956.
Withdrawal of Previous Notice dated Jun. 5, 2007 from U.S. Appl. No. 11/199,956.
Non-Final Office Action dated Jun. 5, 2007 from U.S. Appl. No. 11/199,956.
Amendment dated Dec. 5, 2007 from U.S. Appl. No. 11/199,956.
Non-Final Office Action dated Mar. 3, 2008 from U.S. Appl. No. 11/199,956.
Request for Continued Examination dated Sep. 2, 2008 from U.S. Appl. No. 11/199,956.
Non-Final Office Action dated Nov. 7, 2008 from U.S. Appl. No. 11/199,956.
Notice of Appeal dated Feb. 3, 2009 from U.S. Appl. No. 11/199,956.
Appeal Brief dated Apr. 3, 2009 from U.S. Appl. No. 11/199,956.
Examiner's Answer dated Jul. 17, 2009 from U.S. Appl. No. 11/199,956.
Reply Brief dated Sep. 8, 2009 from U.S. Appl. No. 11/199,956.

\* cited by examiner

UMBRELLA APPARATUS

This application is a continuation of U.S. application Ser. No. 10/068,424, filed 7 Feb. 2002, titled "Umbrella Apparatus," which issued on 2 Sep. 2003 under U.S. Pat. No. 6,612,713, which claims the benefit of U.S. Provisional Application No. 60/267,018, filed 7 Feb. 2001, titled "Lighted Patio Umbrella Apparatus;" and of U.S. Provisional Application No. 60/335,933, filed 2 Nov. 2001, titled "Outdoor Lighting Systems with Cold Cathode Tubes."

BACKGROUND OF THE INVENTION

1. Field of the Invention

The present invention relates in general to patio umbrellas, and in particular, to an improved patio umbrella with integral lighting system and other modular electronic systems and components.

2. Description of the Prior Art

There has been a recent increase in the interest in entertaining in a lawn and garden environment. Patio furniture is quite popular and useful for outdoor entertaining, especially in portions of the country that have warmer climates. However, the sun often presents an impediment to such outdoor entertaining. Consequently, sales have increased for relatively large patio and table umbrellas for use in shielding or shading table areas and people sitting around the tables from direct exposure to the sunlight. Given the relatively high degree of interest in patio umbrellas, it is likely that improved umbrellas, or umbrellas with enhanced functions, will be well received in the marketplace.

SUMMARY OF THE INVENTION

It is one objective of the present invention to provide a lawn or patio umbrella with an integral lighting system that utilizes cold cathode tubes, light emitting diodes (LED's), or florescent lights, to provide relatively bright outdoor light for reading and other activities that require relatively high light intensities.

It is another objective of the present invention to provide an a lawn or patio umbrella with an integral lighting system that utilizes cold cathode tubes, LED's, or florescent lights, to provide relatively bright outdoor light, and its own rechargeable power supply, including solar cells.

It is yet another objective of the present invention to provide a lawn or patio umbrella with an integral lighting system that utilizes cold cathode tubes, LED's, or florescent lights, to provide relatively bright outdoor light, and a motorized retraction system that aids in opening and closing the umbrella.

It is yet another objective of the present invention to provide a lawn or patio umbrella with an integral lighting system that utilizes cold cathode tubes, LED's, or florescent lights, to provide relatively bright outdoor light, and a cooling system, such as one that utilizes electric fans or misting systems.

It is yet another objective of the present invention to provide a modular, electrically powered lawn or patio umbrella in which lighting systems, such as those utilizing cold cathode tubes, LED's, or florescent lights; cooling systems, such as those utilizing electric fans or misting systems; and motorized retraction systems; can be selectively interchanged.

The above objects are achieved, for example, by integrating a rechargeable power system, a lighting system, a motorized retraction system, and/or a cooling system into a relatively large patio umbrella. The resulting umbrella does not have to be connected to a household electrical system, is a relatively low power consuming device, does not generate much heat, provides a high amount of light intensity, reduces the overall energy consumption of outdoor lighting, allows for fewer batteries to be utilized in each lighting fixture, allows for easier recharging of the batteries due to the lower power requirements, and allows the utilization of smaller photovoltaic solar cells.

In the embodiment that utilizes a cold cathode tube, one additional advantage is that the cold cathode tube may be operated at multiple voltage levels to provide differing amounts of light output. In one particular embodiment, a wireless receiver and transmitter pair may be utilized to allow an operator to use a wireless command signal to change the operating state of the lighting system, such as switching the system between an on and off condition, and switching the system between varying levels of light output. Accordingly, an operator may intensify the light output from the lighting system through use of a wireless handheld transmitter when he wants additional light from a particular umbrella.

BRIEF DESCRIPTION OF THE DRAWINGS

The novel features believed characteristic of the invention are set forth in the appended claims. However, the invention itself, as well as a preferred mode of use and further objectives and advantages thereof, will best be understood by reference to the following detailed description of the preferred embodiment when read in conjunction with the following drawings.

DETAILED DESCRIPTION OF THE INVENTION

Figure 1:
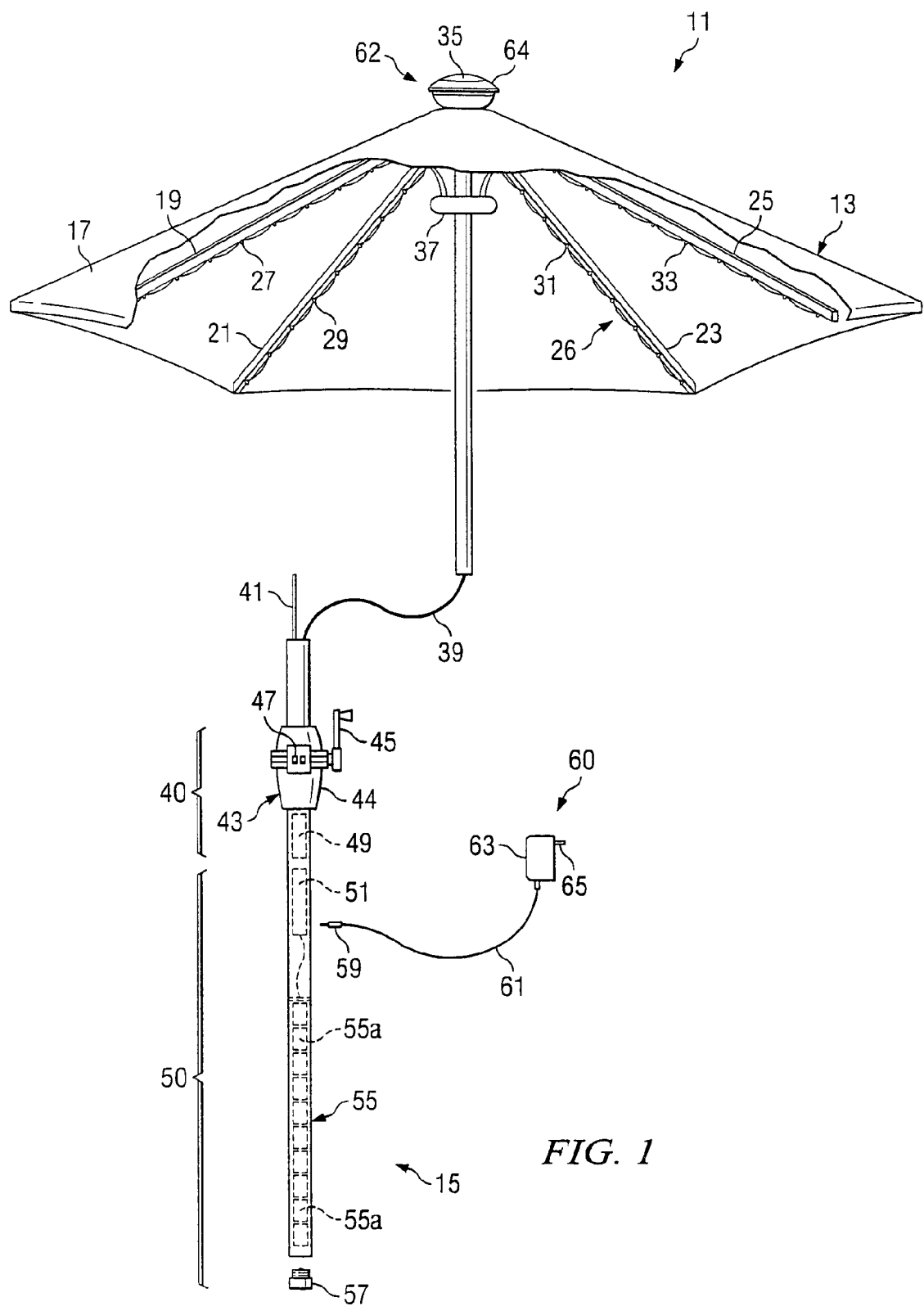
FIG. 1 is a fragmentary and sectional view of the preferred embodiment of the lighted umbrella with motorized opening and closing system according to the present invention.

Referring to FIG. 1 in the drawings, one embodiment of an umbrella apparatus according to the present invention is illustrated. Umbrella apparatus 11 includes an umbrella portion 13 and a hollow tubular pole portion 15. Pole portion 15 is coupled to and supports umbrella portion 13. Umbrella portion 13 is preferably retractable and may be moved between a raised, or expanded open position, which is shown; and a lowered, or retracted, closed position in which umbrella portion is collapsed down about pole portion 15, as is conventional. A flexible canopy 17 is attached to and covers umbrella portion 15. Canopy 17 is supported by a plurality of rib members 19, 21, 23, and 25. Rib members 19, 21, 23, and 25 are preferably hingedly coupled to pole portion 15 at an upper portion of pole portion 15. An integral lighting system 26 is carried by at least one of rib members 19, 21, 23, or 25. Lighting system 26 provides high intensity light to umbrella apparatus 11 and the surrounding area. In the embodiment of FIG. 1, lighting system 26 preferably utilizes a cold cathode tube which will be described in greater detail herein.

Umbrella apparatus 11 may include a base member adapted to receive pole portion 15 and to support umbrella apparatus 11 in a generally upright position. Although not shown in the embodiment FIG. 1, other embodiments of the present invention depict a variety of conventional and novel base members, any of which may be utilized with the embodiment of FIG. 1. It should be understood that in all of the embodiments of the present invention discussed herein, umbrella apparatus 11 may be used with little or no base member whatsoever, provided there is a table or some other support structure, including the ground, which may be adapted to receive pole portion 15. For example, many patio tables are designed with central apertures to receive, support, and stabilize relatively large umbrellas. In some cases, the patio tables eliminate the need for a base member all together.

In accordance with the preferred embodiment of the present invention, light system 26 includes a plurality of light strands 27, 29, 31, and 33 attached to rib members 19, 21, 23, and 25. Each light strand 27, 29, 31, and 33 includes electrical wiring 39 which conductively connects a plurality of small cold cathode tube light bulbs together for providing the high intensity light under canopy 17 and in the area surrounding umbrella apparatus 11. A wiring ring 37 secures and locates electrical wiring 39 of light strands 27, 29, 31, and 33, so that electrical wiring 39 may be passed through the hollow interior of pole portion 15 to a power source, as will be described in detail below.

Umbrella apparatus 11 includes an optional opening and closing system 40 that aids in expanding umbrella portion 13 into the open condition and retracting umbrella portion 13 into the closed condition. Opening and closing system 40 includes a cable system 41, a gear and pulley system 43 housed in a crank case 44, and a manual crank 45. Crank case 44 is preferably located on pole portion 15 such that crank case 44 is accessible when umbrella portion 13 is in the fully retracted position against pole portion 15. Cable system 41 is coupled between rib members 19, 21, 23, and 25 and gear and pulley system 43, and is preferably disposed within the hollow interior of pole portion 15. Manual crank 45 is coupled to gear and pulley system 43 so as to allow manual opening and closing of umbrella portion 13.

Opening and closing system 40 may be automated by the inclusion of an electric screw driver motor 49, or other similar relatively small diameter motor assembly, and one or more operational switches 47. Motor 49 is preferably disposed within the hollow interior of pole portion 15 and is coupled to gear and pulley system 43. Operational switches 47 are preferably carried by crank case 44, and include one or more switches for controlling the operation of motor 49. With the inclusion of motor 49, a user may expand and retract umbrella portion 13 simply by pressing the appropriate operational switch 47. This feature is particularly advantageous when used with large umbrellas which may be relatively heavy and awkward to operate, or when the user lacks sufficient strength to expand or retract umbrella portion 13.

Umbrella apparatus 11 includes a power system 50 having a power source 55. In this embodiment, power source 55 is preferably disposed in the hollow interior of pole portion 15 at a lower extremity and comprises one or more rechargeable batteries 55a. A releasable end cap 57 having integral ground connectors is provided at the lowermost portion of pole portion 15 to complete the electrical circuit of power system 50 and to allow access to rechargeable batteries 55a, as rechargeable batteries 55a may have to be periodically replaced. Power system 50 provides electrical power to lighting system 26 and opening and closing system 40. An external power system charger 51 is electrically coupled to power system 50 to aid in repeatedly charging rechargeable batteries 55a. As is shown in FIG. 1, an external adapter 60 may be provided. External adapter 60 includes a relatively small plug 59 that is adapted to be conductively received by external power system charger 51, an extension cord 61, an electrical transformer 63, and terminals 65 that allow transformer 63 to be plugged into a conventional AC wall outlet. This allows power system charger 51 to receive power directly from a conventional AC wall outlet in order to recharge rechargeable batteries 55a.

In accordance with a preferred embodiment of the present invention, an alternative power system charger 62 may be provided. Alternate power system charger 62 includes at least one solar cell 35 carried by an upper cap portion 64. Solar cells 35 are conductively coupled to power system charger 51 via wires (not shown) that pass through the hollow interior of pole portion 15, thereby allowing solar cells 35 to provide an electrical charge to recharge rechargeable batteries 55a, provided sunlight falls upon solar cells 35. Because solar cells 35 provide continuous recharging throughout the daylight hours, the amount and frequency of charging power system 50 with external power system charger 60 may be minimized. It is important to note that locating alternate power system charger 62 atop umbrella portion 13 is unique and advantageous, particularly when alternate power system charger 62 includes solar cells 35 or other types of solar energy collectors. Such location limits the visibility of alternate power system charger 62 and ensures that solar energy collection is maximized.

The embodiment depicted in FIG. 1 is advantageous over the prior art in that it provides a number of useful functions. Umbrella apparatus 11 is lighted by lighting system 26 which does not require continuous access to a conventional AC wall outlet, while providing high intensity light. This allows umbrella apparatus 11 to be placed in a relatively remote lawn or garden locations that are away from, or substantially removed from, conventional AC power outlets. During daylight hours, solar cells 35 provide a continuous trickle charge to recharge rechargeable batteries 55a, thereby reducing the need for and frequency of use of external power system charger 60. However, when an electrical charge is needed, external power system charger 60 may be utilized to directly charge power system charger 51. Of course, a conventional extension cord may be used, thereby eliminating the need to move umbrella apparatus 11 from its remote location to a location near an AC power outlet.

Figure 2A:
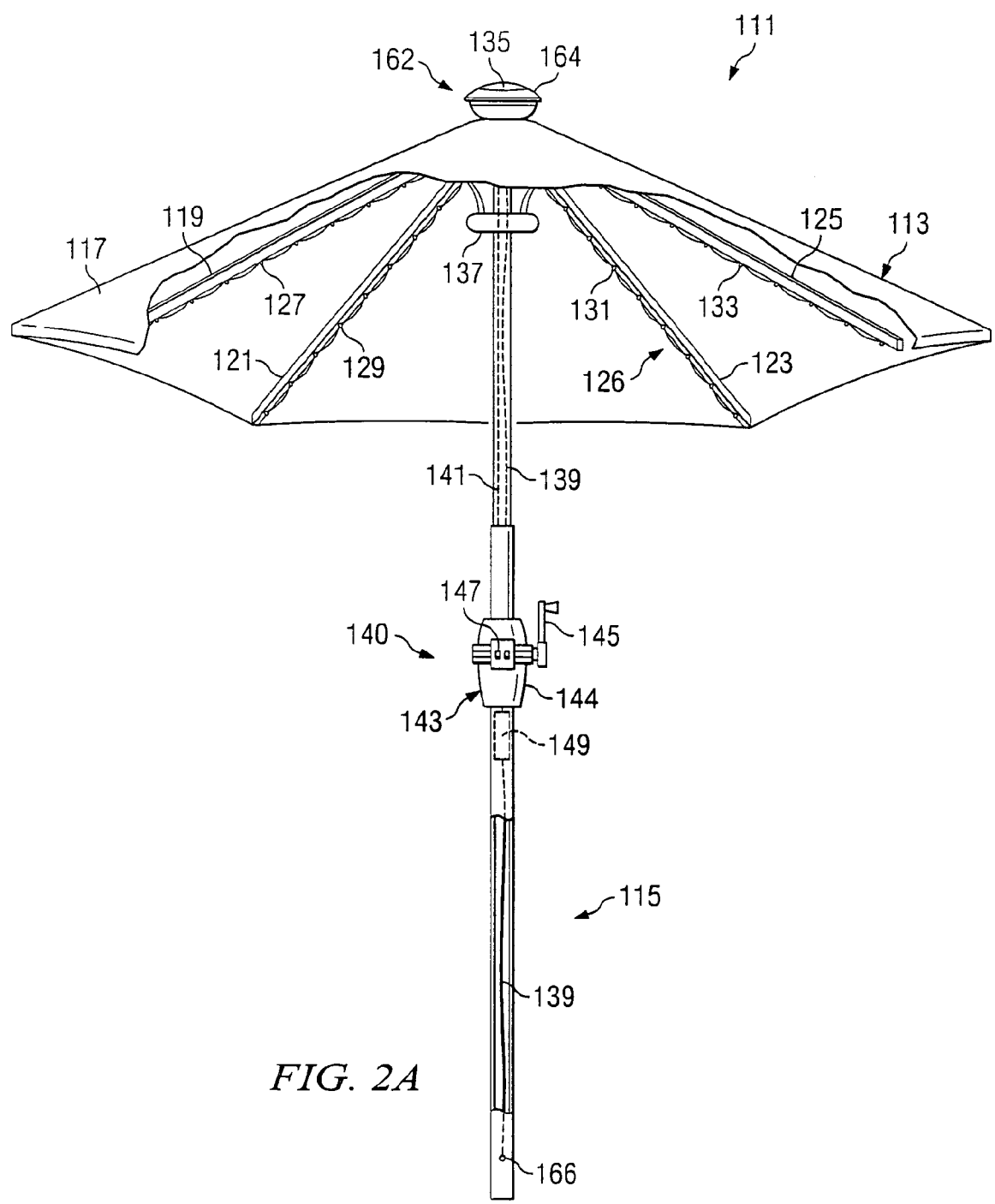
FIGS. 2A, 2B, and 2C are pictorial, fragmentary, and section views of an alternate embodiment of the present invention which is directed to a lighted umbrella with a stand and a single battery and removable base cover.
Figure 2B:
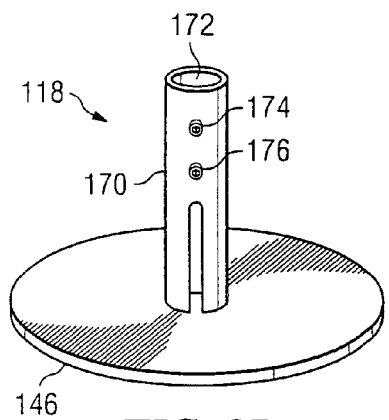
Figure 2C:
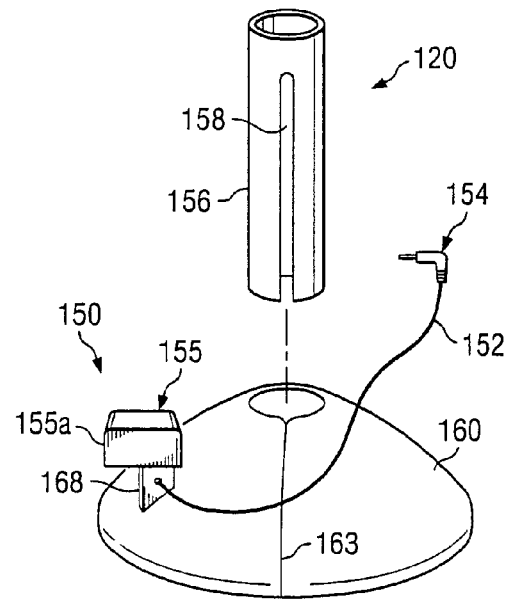

Referring now to FIGS. 2A-2C in the drawings, another embodiment of the present invention is illustrated. In this embodiment, an umbrella apparatus 111 includes an umbrella portion 113, a pole portion 115, a stand portion 118, and a base portion 120 adapted to house a rechargeable power system 151. Umbrella apparatus 11 includes a lighting system 126 and may include a motorized opening and closing system 140. Umbrella portion 113 is preferably retractable and may be moved between a raised, or expanded open position, which is shown; and a lowered, or retracted, closed position in which umbrella portion is collapsed down about pole portion 115, as is conventional. A flexible canopy 117 is attached to and covers umbrella portion 115. Canopy 117 is supported by a plurality of rib members 119, 121, 123, and 125. Rib members 119, 121, 123, and 125 are preferably hingedly coupled to pole portion 115 at an upper portion of pole portion 115. An integral lighting system 126 is carried by at least one of rib members 119, 121, 123, or 125. Lighting system 126 provides high intensity light to umbrella apparatus 111 and the surrounding area. In the embodiment of FIGS. 2A-2C, lighting system 126 preferably utilizes a cold cathode tube which will be described in greater detail herein.

Lighting system 126 includes a plurality of light strands 127, 129, 131, and 133 attached to rib members 119, 121, 123, and 125. Each light strand 127, 129, 131, and 133 includes electrical wiring 139 which conductively couples a plurality of small cold cathode tube light bulbs together for providing the high intensity light under canopy 117 and in the area surrounding umbrella apparatus 111. A wiring ring 137 secures and locates electrical wiring 139 of light strands 127, 129, 131, and 133, so that electrical wiring 139 may be passed through the hollow interior of pole portion 115 to a power source, as will be described in detail below.

Umbrella apparatus 111 includes an optional opening and closing system 140 that aids in expanding umbrella portion 113 into the open condition and retracting umbrella portion 113 into the closed condition. Opening and closing system 140 includes a cable system 141, a gear and pulley system 143 housed in a crank case 144, and a manual crank 145. Crank case 144 is preferably located on pole portion 115 such that crank case 144 is accessible when umbrella portion 113 is in the fully retracted position against pole portion 115. Cable system 141 is coupled between rib members 119, 121, 123, and 125 and gear and pulley system 143, and is preferably disposed within the hollow interior of pole portion 115. Manual crank 145 is coupled to gear and pulley system 143 so as to allow manual opening and closing of umbrella portion 113.

Opening and closing system 140 may be automated by the inclusion of an electric screw driver motor 149, or other similar relatively small diameter motor assembly, and one or more operational switches 147. Motor 149 is preferably disposed within the hollow interior of pole portion 115 and is coupled to gear and pulley system 143. Operational switches 147 are preferably carried by crank case 144, and include one or more switches for controlling the operation of motor 149. With the inclusion of motor 149, a user may expand and retract umbrella portion 113 simply by pressing the appropriate operational switch 147. This feature is particularly advantageous when used with large umbrellas which may be relatively heavy and awkward to operate, or when the user lacks sufficient strength to expand or retract umbrella portion 113.

Umbrella apparatus 111 includes a power system 150 having a power source 155. In this embodiment, power source 155 is preferably adapted to be conductively coupled to base portion 120 and comprises a rechargeable battery pack 155a, preferably an 18-Volt rechargeable battery pack. Battery pack 155a is preferably the type of rechargeable battery that is utilized with most modern cordless power tools, such as drills, saws, and sanders. Battery pack 155a is adapted to be repeatedly recharged by plugging battery pack 155a into a conventional charger (not shown) that is plugged into a conventional AC power outlet. Power system 150 provides electrical power to lighting system 126 and opening and closing system 140.

In accordance with a preferred embodiment of the present invention, an alternative power system charger 162 may be provided. Alternate power system charger 162 includes at least one solar cell 135 carried by an upper cap portion 164. Solar cells 135 are conductively coupled to power system 150 via wires (not shown) that pass through the hollow interior of pole portion 115, thereby allowing solar cells 135 to provide an electrical charge to recharge rechargeable battery pack 155a, provided sunlight falls upon solar cells 135. Because solar cells 135 provide continuous recharging throughout the daylight hours, the frequency with which battery pack 155a must be replaced or recharged may be minimized. It is important to note that locating alternate power system charger 162 atop umbrella portion 113 is unique and advantageous, particularly when alternate power system charger 162 includes solar cells 135 or other types of solar energy collectors. Such location limits the visibility of alternate power system charger 162 and ensures that solar energy collection is maximized.

Stand portion 118 includes an upright shaft portion 170 having a central aperture 172 that is adapted to receive the pole portion 115 of umbrella apparatus 111. A plurality of screw clamps 174 and 176 are provided to secure pole portion 115 within shaft portion 170. A bottom portion 146 is provided to stabilize umbrella apparatus 111 while umbrella apparatus 111 is installed within stand portion 118.

Base portion 120 includes a removable cylindrical sleeve 156, a removable cover 160, and a receiver 168. Sleeve 156 is configured to slip over the exterior of shaft portion 170, and includes a longitudinal slot 158 that allows access to screw clamps 174 and 176 when sleeve 156 is placed over shaft portion 170. Slot 158 also allows access to a connector 166 disposed in the lower portion of pole portion 115 when sleeve 156 is placed over shaft portion 170. Connector 166 is conductively coupled to the wires from alternate power system charger 162 and solar cells 135. Cover 160 is preferably concave in shape, thereby defining an interior space which may be used to house the electronics (not shown) of power system 150. Cover 160 may include one or more seams 163 that allow access to the interior space defined by cover 160. Receiver 168 releasably receives battery pack 155a. A wire 152 and plug 154 conductively couple battery pack 155a to connector 166, thereby providing an electrical circuit between rechargeable battery pack 155a and light strands 119, 121, 123, and 125 of lighting system 126.

The embodiment depicted in FIGS. 2A-2C is advantageous over the prior art in that it provides a number of useful functions. Umbrella apparatus 111 is lighted by lighting system 126 which does not require continuous access to a conventional AC wall outlet, while providing high intensity light. This allows umbrella apparatus 111 to be placed in a relatively remote lawn or garden locations that are away from, or substantially removed from, conventional AC power outlets.

During daylight hours, solar cells 135 provide a continuous trickle charge to recharge rechargeable battery pack 155a, thereby reducing the frequency with which battery pack 155a must be replaced or recharged. Additionally, this embodiment is advantageous over the prior art in that conventional rechargeable battery packs, which are commonly used with cordless power tools, may be utilized. If battery pack 155a is insufficiently charged illuminate light strands 119, 121, 123, and 125 of light system 126, the user may simply replace battery pack 155a with another fully charged battery pack 155a. In this manner, lighting system 126 of umbrella apparatus 111 may be energized conveniently, even though umbrella apparatus 111 may be located extremely remotely from an AC power outlet, such as in a garden patio, or on a boat dock. In this embodiment, there is no need to use extension cords to charge an alternate power system charger.

Figure 3A:
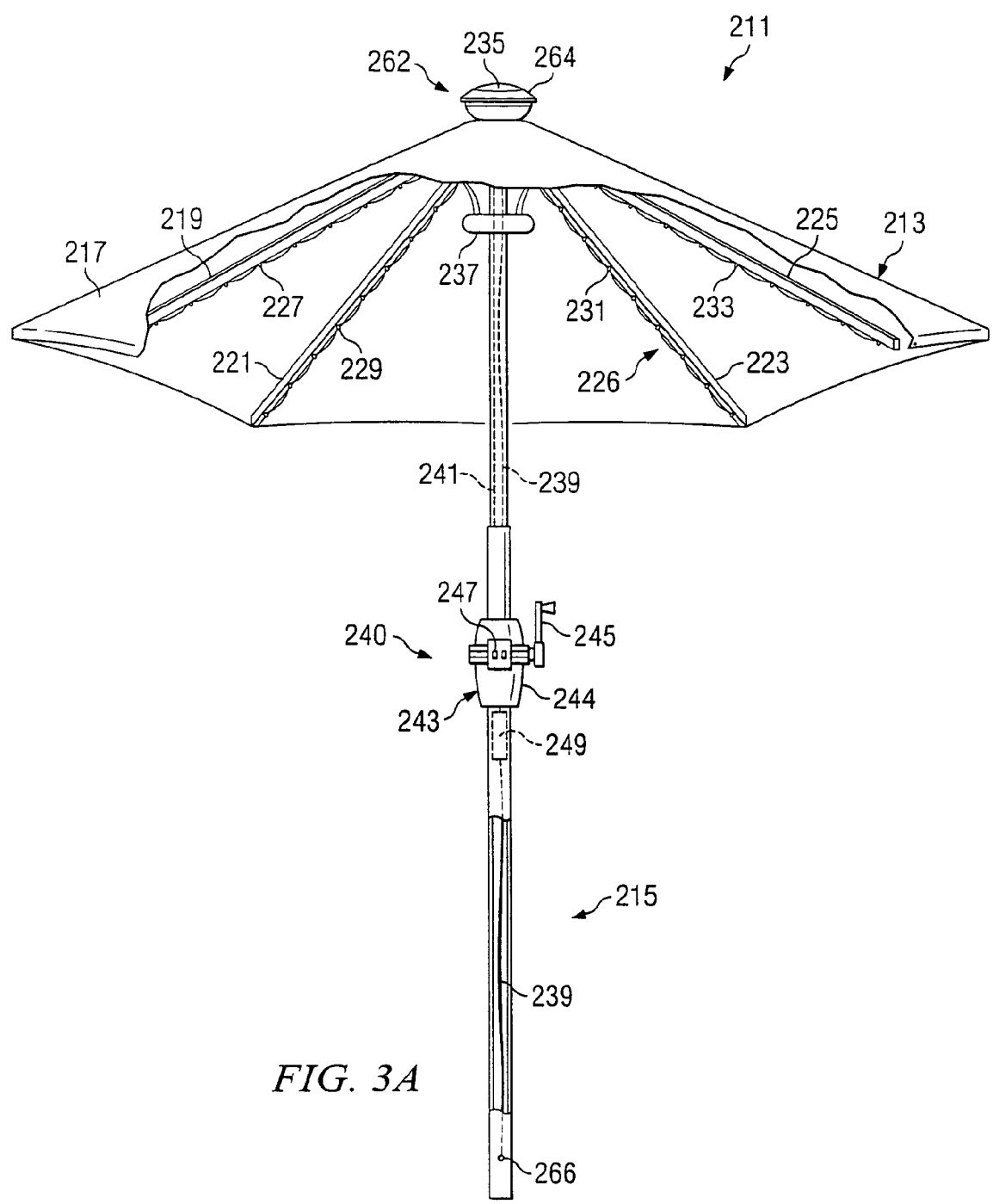
FIGS. 3A, 3B, and 3C are pictorial, fragmentary, and partial section views of another alternate embodiment of the present invention which is directed to a lighted umbrella with a stand, charger, batteries, and removable battery cover.
Figure 3B:
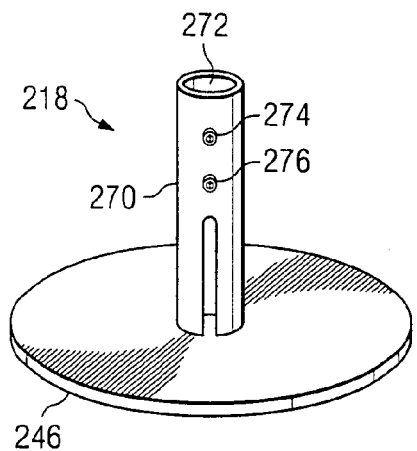
Figure 3C:
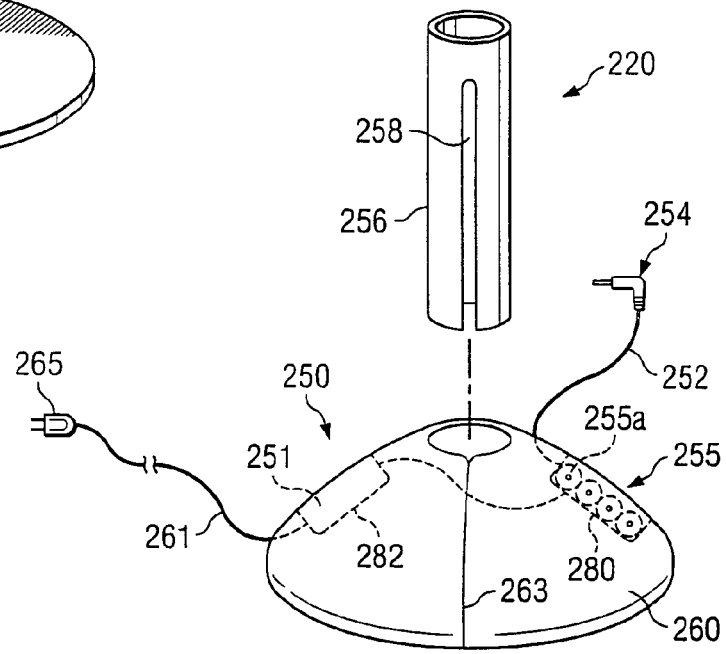

Referring now to FIGS. 3A-3C in the drawings, another embodiment of the present invention is illustrated. In this embodiment, an umbrella apparatus 211 includes an umbrella portion 213, a pole portion 215, a stand portion 218, and a base portion 220 adapted to house a rechargeable power system 251. Umbrella apparatus 211 includes a lighting system 226 and may include a motorized opening and closing system 240. Umbrella portion 213 is preferably retractable and may be moved between a raised, or expanded open position, which is shown; and a lowered, or retracted, closed position in which umbrella portion is collapsed down about pole portion 215, as is conventional. A flexible canopy 217 is attached to and covers umbrella portion 215. Canopy 217 is supported by a plurality of rib members 219, 221, 223, and 225. Rib members 219, 221, 223, and 225 are preferably hingedly coupled to pole portion 215 at an upper portion of pole portion 215. An integral lighting system 226 is carried by at least one of rib members 219, 221, 223, or 225. Lighting system 226 provides high intensity light to umbrella apparatus 211 and the surrounding area. In the embodiment of FIGS. 3A-3C, lighting system 226 preferably utilizes a cold cathode tube which will be described in greater detail herein.

Lighting system 226 includes a plurality of light strands 227, 229, 231, and 233 attached to rib members 219, 221, 223, and 225. Each light strand 227, 229, 231, and 233 includes electrical wiring 239 which conductively couples a plurality of small cold cathode tube light bulbs together for providing the high intensity light under canopy 217 and in the area surrounding umbrella apparatus 211. A wiring ring 237 secures and locates electrical wiring 239 of light strands 227, 229, 231, and 233, so that electrical wiring 239 may be passed through the hollow interior of pole portion 215 to a power source, as will be described in detail below.

Umbrella apparatus 211 includes an optional opening and closing system 240 that aids in expanding umbrella portion 213 into the open condition and retracting umbrella portion 213 into the closed condition. Opening and closing system 240 includes a cable system 241, a gear and pulley system 243 housed in a crank case 244, and a manual crank 245. Crank case 244 is preferably located on pole portion 215 such that crank case 244 is accessible when umbrella portion 213 is in the fully retracted position against pole portion 215. Cable system 241 is coupled between rib members 219, 221, 223, and 225 and gear and pulley system 243, and is preferably disposed within the hollow interior of pole portion 215. Manual crank 245 is coupled to gear and pulley system 243 so as to allow manual opening and closing of umbrella portion 213.

Opening and closing system 240 may be automated by the inclusion of an electric screw driver motor 249, or other similar relatively small diameter motor assembly, and one or more operational switches 247. Motor 249 is preferably disposed within the hollow interior of pole portion 215 and is coupled to gear and pulley system 243. Operational switches 247 are preferably carried by crank case 244, and include one or more switches for controlling the operation of motor 249. With the inclusion of motor 249, a user may expand and retract umbrella portion 213 simply by pressing the appropriate operational switch 247. This feature is particularly advantageous when used with large umbrellas which may be relatively heavy and awkward to operate, or when the user lacks sufficient strength to expand or retract umbrella portion 213.

Umbrella apparatus 211 includes a power system 250 having a rechargeable power source 255. In this embodiment, power source 255 is preferably adapted to be conductively coupled to and hosed within base portion 220 and comprises a bundle of rechargeable batteries 255a. Power system 250 provides electrical power to lighting system 226 and opening and closing system 240. An external power system charger and transformer 251 is electrically coupled to power system 250 to aid in repeatedly charging rechargeable batteries 255a. An extension cord 261 having terminals 265 allow external power system charger and transformer 251 to be plugged into a conventional AC wall outlet. This allows external power system charger and transformer 251 to receive power directly from a conventional AC wall outlet in order to recharge rechargeable batteries 255a.

In accordance with a preferred embodiment of the present invention, an alternative power system charger 262 may be provided. Alternate power system charger 262 includes at least one solar cell 235 carried by an upper cap portion 264. Solar cells 235 are conductively coupled to power system 250 via wires (not shown) that pass through the hollow interior of pole portion 215, thereby allowing solar cells 235 to provide an electrical charge to recharge rechargeable batteries 255a, provided sunlight falls upon solar cells 235. Because solar cells 235 provide continuous recharging throughout the daylight hours, the frequency with which batteries 255a must be replaced or recharged may be minimized. It is important to note that locating alternate power system charger 262 atop umbrella portion 213 is unique and advantageous, particularly when alternate power system charger 262 includes solar cells 235 or other types of solar energy collectors. Such location limits the visibility of alternate power system charger 262 and ensures that solar energy collection is maximized.

Stand portion 218 includes an upright shaft portion 270 having a central aperture 272 that is adapted to receive pole portion 215 of umbrella apparatus 211. A plurality of screw clamps 274 and 276 are provided to secure pole portion 215 within shaft portion 270. A bottom portion 246 is provided to stabilize umbrella apparatus 211 while umbrella apparatus 211 is installed within stand portion 218.

Base portion 220 includes a removable cylindrical sleeve 256, a removable cover 260, and recessed portions 280 and 282. Sleeve 256 is configured to slip over the exterior of shaft portion 270, and includes a longitudinal slot 258 that allows access to screw clamps 274 and 276 when sleeve 256 is placed over shaft portion 270. Slot 258 also allows access to a connector 266 disposed in the lower portion of pole portion 215 when sleeve 256 is placed over shaft portion 270. Connector 266 is conductively coupled to the wires from alternate power system charger 262 and solar cells 235. Cover 260 is preferably concave in shape, thereby defining an interior space which may be used to house the electronics (not shown) of power system 250. Cover 260 may include one or more seams 263 that allow access to the interior space defined by cover 260. Recessed portion 280 releasably receives batteries 255a, and recessed portion 282 releasably receives external power system charger 251. A wire 252 and plug 254 conductively couple batteries 255a to connector 266, thereby providing an electrical circuit between rechargeable batteries 255a and light strands 219, 221, 223, and 225 of lighting system 226.

The embodiment depicted in FIGS. 3A-3C is advantageous over the prior art in that it provides a number of useful functions. Umbrella apparatus 211 is lighted by lighting system 226 which does not require continuous access to a conventional AC wall outlet, while providing high intensity light. This allows umbrella apparatus 211 to be placed in a relatively remote lawn or garden locations that are away from, or substantially removed from, conventional AC power outlets. During daylight hours, solar cells 235 provide a continuous trickle charge to recharge rechargeable batteries 255a, thereby reducing the frequency with which batteries 255a must be replaced or recharged. However, when an electrical charge is needed, external power system charger 251 may be utilized to directly charge batteries 255a. Of course, a conventional extension cord may be used, thereby eliminating the need to move umbrella apparatus 211 from its remote location to a location near an AC power outlet.

Figure 4A:
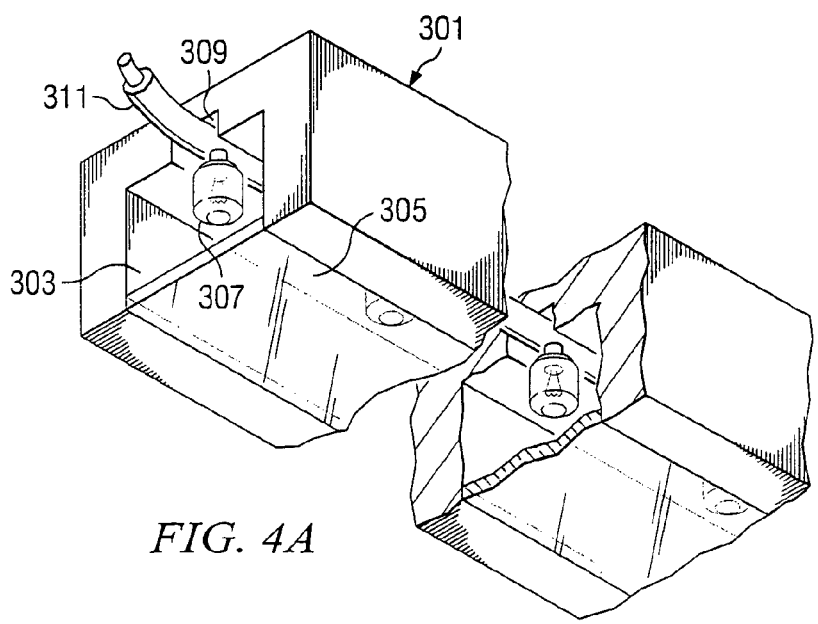
FIG. 4A is a fragmentary and sectional view of another alternate embodiment of the present invention which is directed to a lighted umbrella with recessed lighting.

Referring now to FIG. 4A in the drawings, the preferred embodiment of lighting systems 26, 126, and 226 of the present invention is illustrated. In this embodiment, a plurality of lighting elements 307, preferably cold cathode tube bulbs, are recessed into a rib member 301. Rib member 301 is indicative of rib members 19, 21, 23, 25, 119, 121, 123, 125, 219, 221, 223, and 225. As is shown, a cavity 303 is formed within rib 301. Cavity 303 is adapted to receive and hold light bulb 307. A translucent material 305 extends along the entire length of the cavity 303 to protect bulbs 307 from damage and undesirable exposure to weather and other conditions. Translucent material 305 may have a smooth surface or be textured to accentuate or enhance the light from bulbs 307. Although only a single cold cathode tube bulb 307 is illustrated, it should be understood that there may be many bulbs 307 spaced along the length of rib member 301 to illuminate the area under umbrella apparatus 11, 111, or 211. Rib member 301 includes a wiring channel 309 configured to receive a wire 311 that conductively connects all of the bulbs 307 installed in rib member 301, thereby forming an electrical circuit between bulbs 307 and the rechargeable power source, such as power sources 50, 150, and 250. In this manner, recessed lighting, which is carried entirely within rib member 301 and is not otherwise exposed to the elements, is achieved.

Figure 4B:
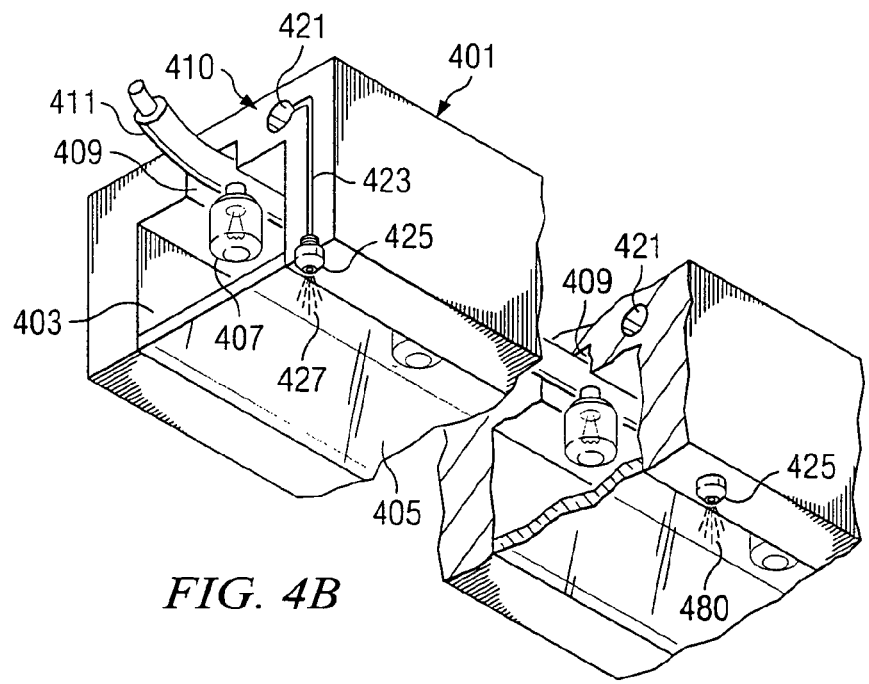
FIG. 4B is a fragmentary and sectional view of another alternate embodiment of the present invention which is directed to a lighted umbrella with integral misting system.

Referring now to FIG. 4B in the drawings, an alternate embodiment of lighting systems 26, 126, and 226 of the present invention is illustrated. This embodiment is similar to the embodiment of FIG. 4A, with the exception that an integral cooling system 410 has been added. In this embodiment, a plurality of lighting elements 307, preferably cold cathode tube bulbs, are recessed into a rib member 301. Rib member 301 is indicative of rib members 19, 21, 23, 25, 119, 121, 123, 125, 219, 221, 223, and 225. Cooling system 410 comprises a misting means that provides a light mist to cool the area under umbrella apparatus 11, 111, or 211. A cavity 403 is formed within rib member 401. Cavity 403 is adapted to receive and hold light bulb 407. A translucent material 405 extends along the entire length of the cavity 403 to protect bulbs 407 from damage and undesirable exposure to weather and other conditions. Translucent material 405 may have a smooth surface or be textured to accentuate or enhance the light from bulbs 407. Although only a single cold cathode tube bulb 407 is illustrated, it should be understood that there may be many bulbs 407 spaced along the length of rib member 401 to illuminate the area under umbrella apparatus 11, 111, or 211. Rib member 401 includes a wiring channel 409 configured to receive a wire 411 that conductively connects all of the bulbs 407 installed in rib member 401, thereby forming an electrical circuit between bulbs 407 and the rechargeable power source, such as power sources 50, 150, and 250. In this manner, recessed lighting, which is carried entirely within rib member 401 and is not otherwise exposed to the elements, is achieved.

A fluid supply channel 421 is provided in order to receive a fluid tight hose which supplies water to a plurality of misting nozzles 425 which generate mist 427 and 480. A fluid discharge channel 423 is provided to carry a fluid tight hose which carries water from the hose in fluid supply channel 421 to misting nozzles 425. In this embodiment, umbrella apparatus should include a small reservoir (not shown) of water or other water source, such as an inlet hose, and an electric pump to pressurize and pump the water through cooling system 410. In this manner, umbrella apparatus 11, 111, or 211 provides both light and a cooling mist to those in close proximity.

Figure 4C:
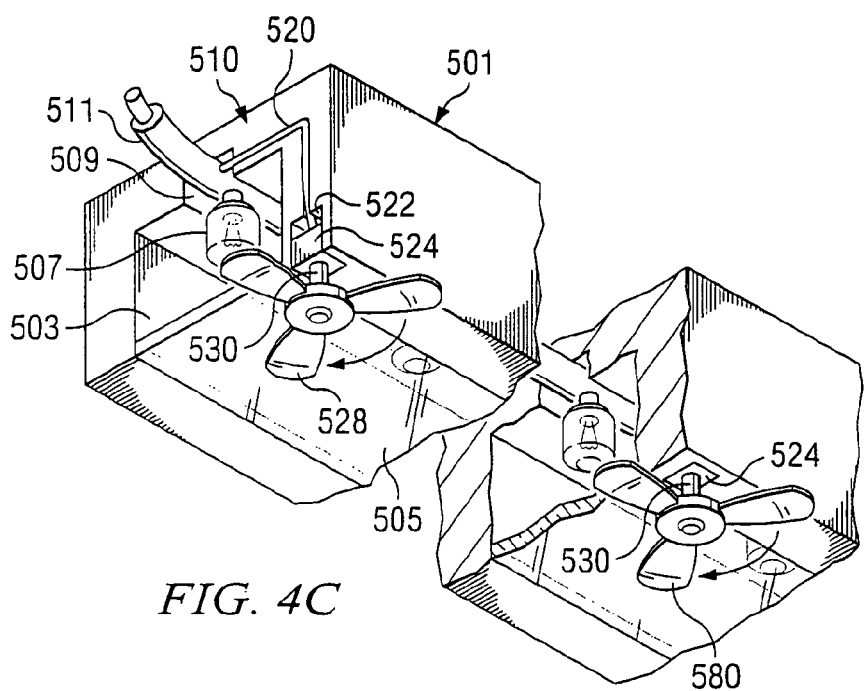
FIG. 4C is a fragmentary and sectional view of another alternate embodiment of the present invention which is directed to a lighted umbrella with an integral fan system.

Referring now to FIG. 4C in the drawings, another embodiment of lighting systems 26, 126, and 226 of the present invention is illustrated. This embodiment is similar to the embodiment of FIG. 4A, with the exception that a different integral cooling system 510 has been added. In this embodiment, a plurality of lighting elements 507, preferably cold cathode tube bulbs, are recessed into a rib member 501. Rib member 501 is indicative of rib members 19, 21, 23, 25, 119, 121, 123, 125, 219, 221, 223, and 225. Cooling system 510 comprises a fanning means that provides a cool breeze under umbrella apparatus 11, 111, or 211. A cavity 503 is formed within rib member 501. Cavity 503 is adapted to receive and hold light bulb 507. A translucent material 505 extends along the entire length of the cavity 503 to protect bulbs 507 from damage and undesirable exposure to weather and other conditions. Translucent material 505 may have a smooth surface or be textured to accentuate or enhance the light from bulbs 507. Although only a single cold cathode tube bulb 507 is illustrated, it should be understood that there may be many bulbs 507 spaced along the length of rib member 501 to illuminate the area under umbrella apparatus 11, 111, or 211. Rib member 501 includes a wiring channel 509 configured to receive a wire 511 that conductively connects all of the bulbs 507 installed in rib member 501, thereby forming an electrical circuit between bulbs 507 and the rechargeable power source, such as power sources 50, 150, and 250. In this manner, recessed lighting, which is carried entirely within rib member 501 and is not otherwise exposed to the elements, is achieved.

A wiring conduit 520 is provided which routes electrical wiring from wire 511 to an electric motor 524 carried in a recessed cavity 522. Fanning means 528 and 580, such as fan blades, are carried by rotating shafts 530 which are connected to motors 524. When energized, motors 524 rotate fan blades 528 and 580, thereby providing a cooling breeze under umbrella apparatus 11, 111, and 211. A plurality of fan blade sets 528 and 580 may be located at predetermined locations along the length of rib member 501.

Figure 5A:
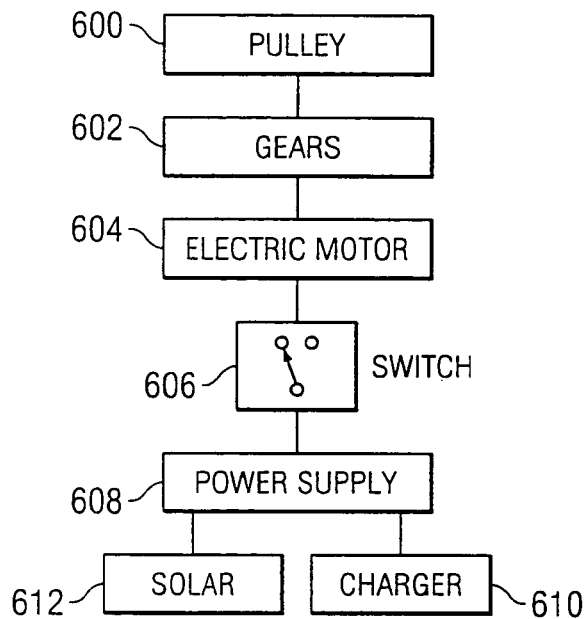
FIG. 5A is a block diagram representation of the motorized opening and closing system of the umbrella of FIG. 1 and of the other embodiments of the umbrella of the present invention.

Referring now to FIG. 5A in the drawings, a block diagram representation of the preferred embodiment of opening and closing systems 40, 140, and 240 is illustrated. As is shown, a pulley system 600 is coupled through gears 602 to an electric motor 604. A switch 606 is electrically connected between a power supply 608 and electric motor 604. Power supply 608 is indicative of rechargeable power systems 50, 150, and 250. External power system charger 610 and solar charger 612 are coupled to power supply 608 to recharge the rechargeable battery elements. External power system charger 610 is indicative of external power system chargers 51 and 251. Solar charger 612 is indicative of alternate power system chargers 62, 162, and 262. Mechanical actuation of switch 606 allows current to flow from power supply 608 to electric motor 604. Motor 604 works through gears 602 to operate pulley 600, thereby opening and closing canopy 17, 117, or 217 of umbrella apparatus 11, 111, or 211, respectively.

Figure 5B:
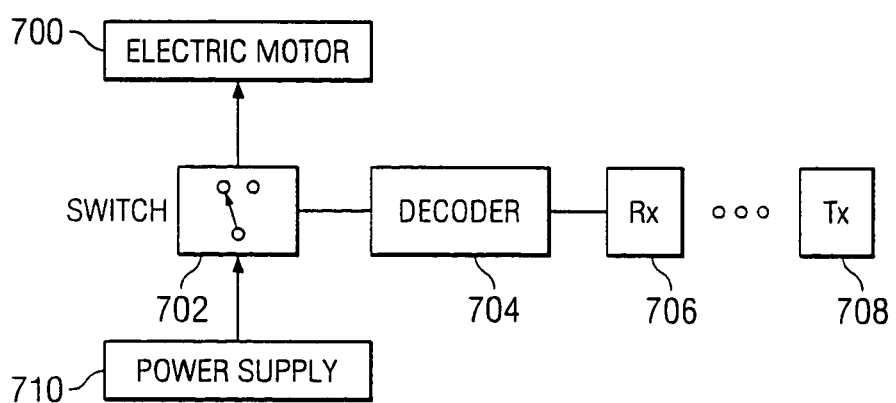
FIG. 5B is a block diagram representation of an alternate embodiment of the motorized opening and closing system of FIG. 5A.

Referring now to FIG. 5B in the drawings, another embodiment of the opening and closing systems 40, 140, and 240 of the present invention is illustrated. In this embodiment, a wireless transmitter 708 is utilized to transmit encoded signals and remotely communicate with a wireless receiver 706 that is carried by umbrella apparatus 11, 111, or 211, preferably near housings 44, 144, and 244. A decoder 704 is provided to decode the encoded signals. As is conventional with such receivers and transmitters, transmitter 708 and receiver 706 may be adapted to be coded on a particular frequency or coding scheme which enable a dedicated transmitter 708 to actuate a particular receiver 706. A decoder 704 coupled to an electrical switch 702 serves to allow for such identification. Switch 702 controls the application of electrical energy from a power supply 710 to an electric motor 700. Power supply 710 is indicative of rechargeable power systems 50, 150, and 250. Motor 700 is indicative of motors 49, 149, and 249. In this manner, a motorized retraction system may be actuated remotely utilizing wireless transmitter 708.

Figure 6:
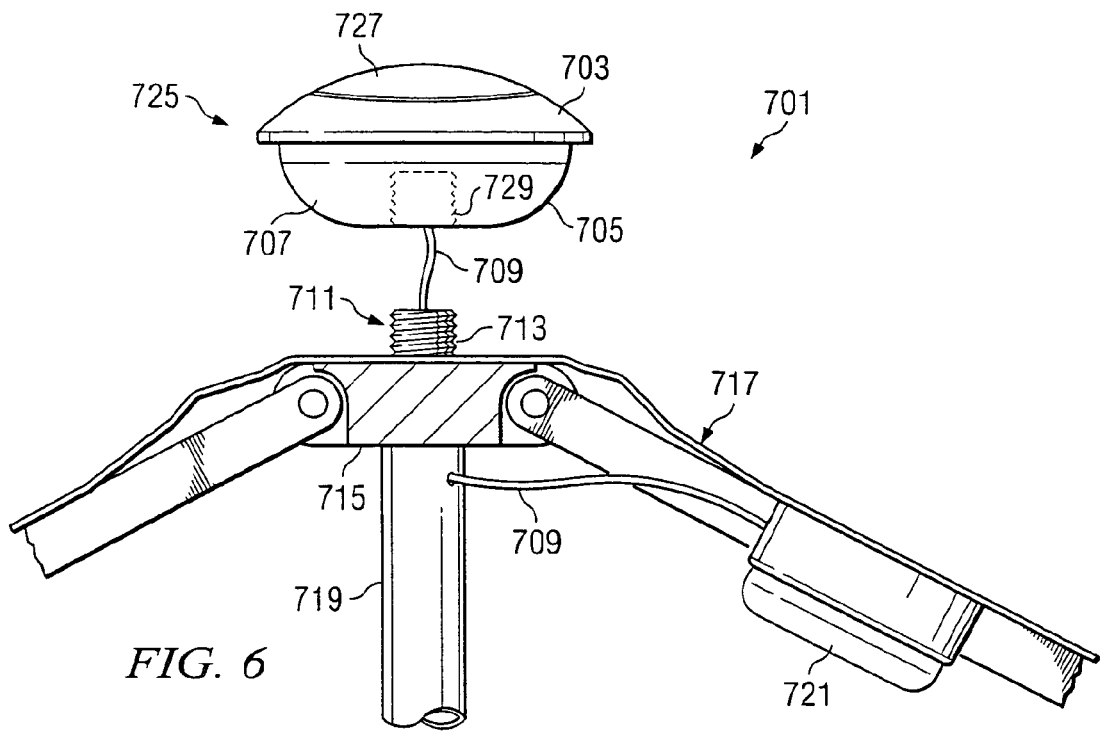
FIG. 6 is a simplified schematic of an alternative embodiment of the present invention which is directed to a lighted umbrella with a top-mounted power unit and a cold cathode tube lighting system.
Figure 7:
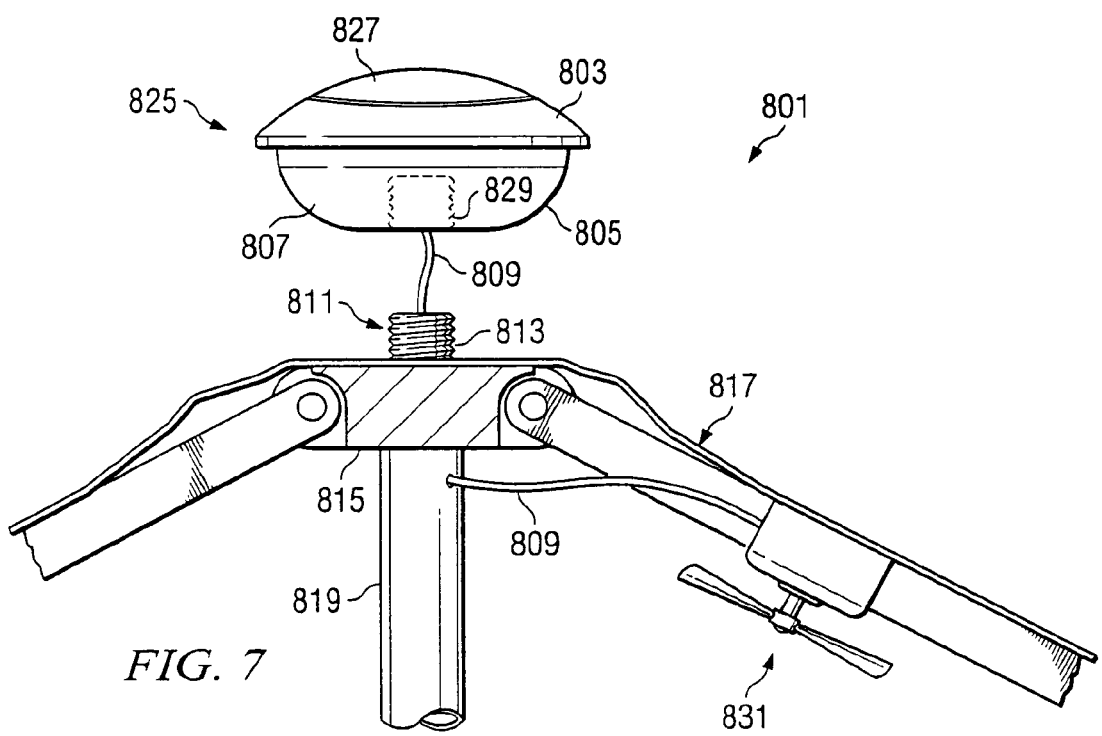
FIG. 7 is a simplified schematic of an alternative embodiment of the present invention which is directed to an umbrella with a top-mounted power unit and an electric fan cooling system.
Figure 8:
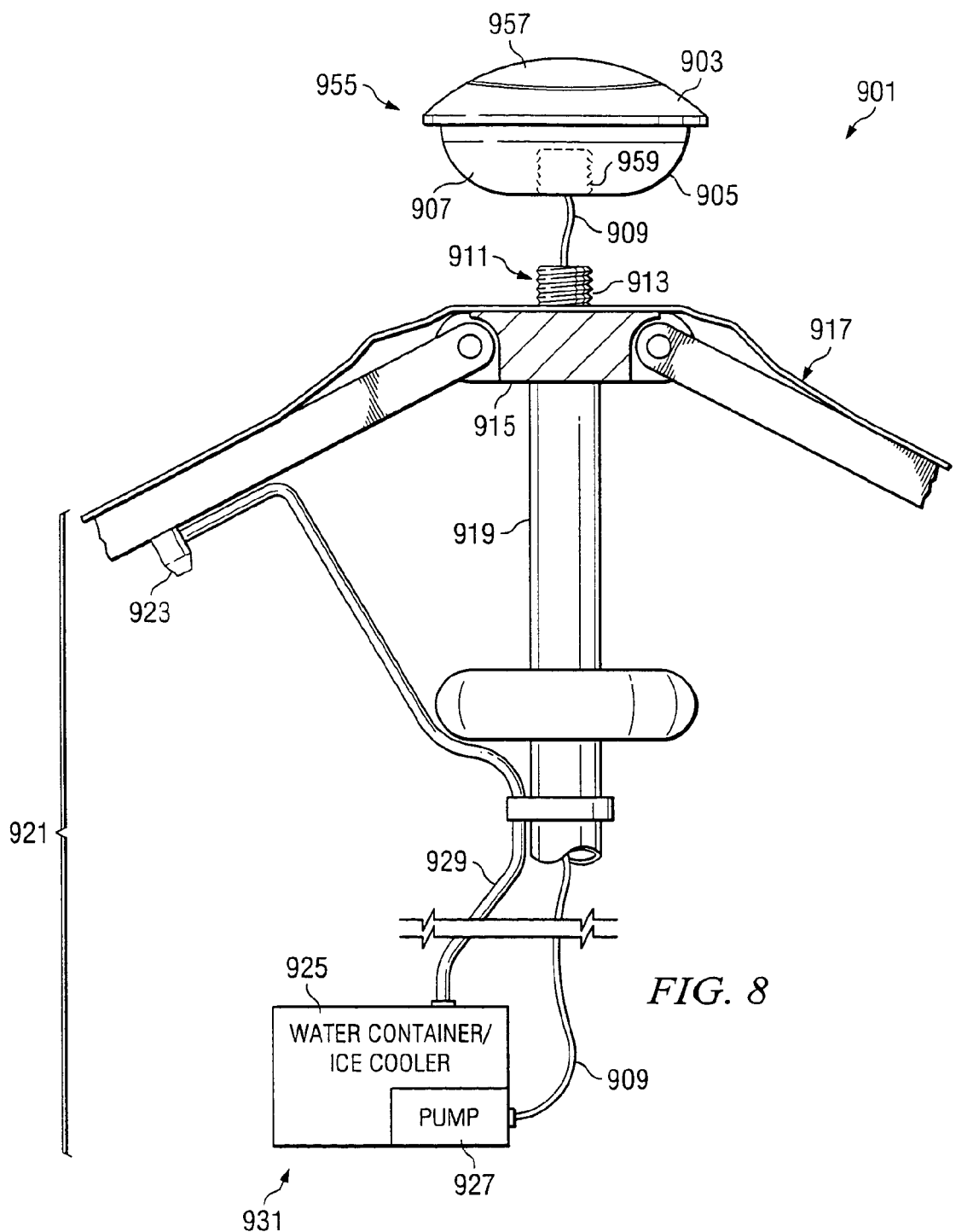
FIG. 8 is a simplified view of an alternative embodiment of the present invention which is directed to an umbrella with a top-mounted power unit and a mist producing cooling system.
Figure 9:
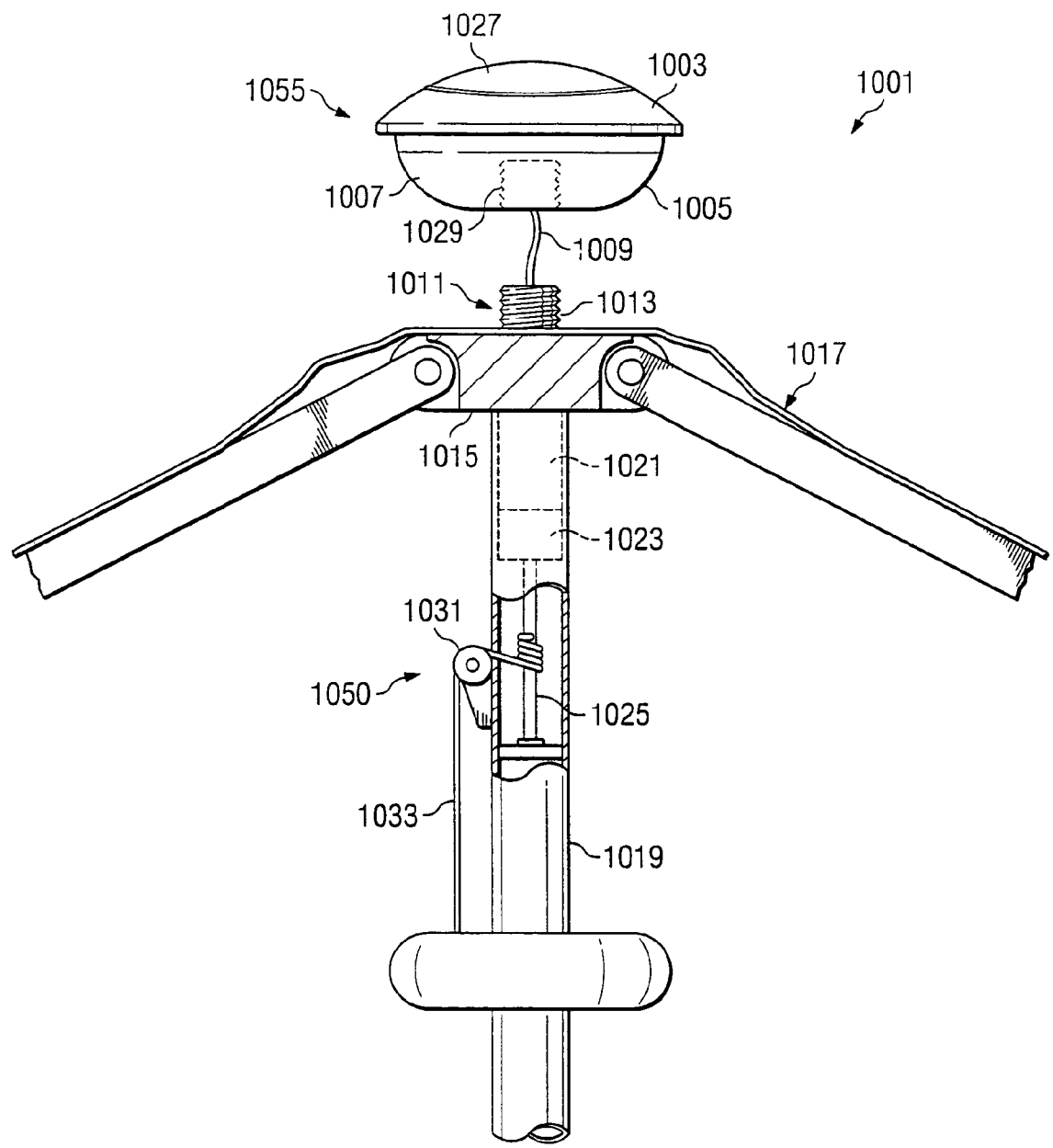
FIG. 9 is a simplified schematic of an alternate embodiment of the present invention that is directed to an umbrella with a top-mounted power unit and a motorized opening and closing system.

Referring now to FIGS. 6-9 in the drawings, the preferred embodiments of the umbrella apparatus of the present invention are illustrated. In these embodiments, the rechargeable power source and solar recharging system are mounted atop the pole portion of the umbrella apparatus above the canopy. One concept which runs throughout the embodiments depicted in FIGS. 6-9 is the utilization of a "power unit." This concept involves the placement of a unitary structure at a defined location relative to the umbrella. For example, in the embodiments of FIGS. 6-9, the power unit is shown at a top location directly above the umbrella apparatus, and secured to the pole portion with a threaded coupling. FIG. 6 depicts a top-mounted power unit and a cold cathode tube lighting system. FIG. 7 depicts a top-mounted power unit with a fanning means cooling system. FIG. 8 depicts a top-mounted power unit with mist producing cooling system. FIG. 9 depicts a top-mounted power unit with an automated opening and closing system.

Although FIGS. 6-9 depict power units with a single electrical system, it should be understood that in alternative embodiments, one could mix and match these electrical subassemblies such that a single power unit provides electrical power to two or more subassemblies. For example, an umbrella apparatus may include a lighting system and either one or both of the cooling systems described above. Alternatively, an umbrella apparatus may include a lighting system, a cooling system, and an automated opening and closing system as described herein. In this manner, the umbrella apparatus of the present invention is modular such that the different subsystems can be easily mixed and matched.

This modularity allows one to manufacture and sell aftermarket kits which can be installed and interchanged by the umbrella owners. Such kits may include a power unit and one or more of the subsystems, such as a lighting system and/or a cooling system and/or an automated opening and closing system. Because the power unit is relatively self-contained, little interaction is required to attach the power unit to an umbrella apparatus. Alternatively, this modularity in design facilitates the mass manufacture of umbrellas, allowing the electrical system to be manufactured by one factory, and the umbrella systems, which do not include electrical systems, to be manufactured by a different factory. The parts can then be brought together in an assembly area and assembled together.

Referring now specifically to FIG. 6, an umbrella apparatus 701 is illustrated. As is shown, a power unit 725 is provided for connection to the uppermost portion of umbrella apparatus 701. In this embodiment, a cold cathode tube light subassembly 721 is provided for connection at a different location to umbrella apparatus 701. Power unit 725 includes a solar collector 727 at its uppermost portion. Solar collector 727 is preferably carried by a top portion 703 of power unit 725. A bottom portion 705 of power unit 725 defines an interior battery compartment 707. Additionally, power unit 725 carries a coupling mechanism 729 to allow coupling between power unit 725 and a pole portion 719 of umbrella apparatus 701, pole portion 719 being adapted at an upper end 711, preferably with threads 713, to releasably receive power unit 725. A top cap 715 hingedly connects pole portion 719 to a canopy 717. Cold cathode tube light subassembly 721 is coupled at a desired location underneath canopy 717 to provide high intensity light in the area surrounding umbrella apparatus 701. Cold cathode tube light subassembly 721 is conductively coupled to power unit 725 by wiring 709 that passes through the hollow interior of pole portion 719. Such light allows users to read, play games, or perform other leisure activities that require a relatively high intensity light. The electrical components of umbrella apparatus 701 are entirely independent of any household electrical system. The power source, such as power sources 50, 150, and 250, carried by power unit 725 is utilized to energize cold cathode tube light subassembly 721. During daylight hours, solar energy is collected by solar panel 727 and is converted and utilized to recharge the rechargeable power source which is maintained within battery compartment 707.

Cold cathode tube light subassembly 721 is described below in more detail below. As will be appreciated by those skilled in the art, other low power lighting systems may be used instead of cold cathode tube light sub assembly 721. For example, an LED or fluorescent lighting subassembly may be utilized instead. LED and fluorescent systems designed for use with solar and low voltage lighting are known in the art. Such alternative lighting sources may be easily used with the present system in manners which are recognized by those skilled in the art. Implementation of LED, fluorescent, or other alternate light sources instead of cold cathode tube light subassembly 721 is a straightforward and need not be further described in detail.

Referring now specifically to FIG. 7 in the drawings, an umbrella apparatus 801 is illustrated. As is shown, a power unit 825 is provided for connection to the uppermost portion of umbrella apparatus 801. In this embodiment, a cooling system 821 comprising a fanning means 831 is provided for connection at a different location to umbrella apparatus 801. Power unit 825 includes a solar collector 827 at its uppermost portion. Solar collector 827 is preferably carried by a top portion 803 of power unit 825. A bottom portion 805 of power unit 825 defines an interior battery compartment 807. Additionally, power unit 825 carries a coupling mechanism 829 to allow coupling between power unit 825 and a pole portion 819 of umbrella apparatus 801, pole portion 819 being adapted at an upper end 811, preferably with threads 813, to releasably receive power unit 825. A top cap 815 hingedly connects pole portion 819 to a canopy 817. Cooling system 821 is coupled at a desired location underneath canopy 817 to provide a cooling breeze in the area surrounding umbrella apparatus 801. Cooling system 821 is conductively coupled to power unit 825 by wiring 809 that passes through the hollow interior of pole portion 819. The electrical components of umbrella apparatus 801 are entirely independent of any household electrical system. The power source, such as power sources 50, 150, and 250, carried by power unit 825 is utilized to energize cooling system 821. During daylight hours, solar energy is collected by solar panel 827 and is converted and utilized to recharge the rechargeable power source which is maintained within battery compartment 807.

Referring now specifically to FIG. 8 in the drawings, an umbrella apparatus 901 is illustrated. As is shown, a power unit 955 is provided for connection to the uppermost portion of umbrella apparatus 901. In this embodiment, a cooling system 921 comprising a misting system 931 is provided for connection at a different location to umbrella apparatus 901. Power unit 955 includes a solar collector 957 at its uppermost portion. Solar collector 957 is preferably carried by a top portion 903 of power unit 955. A bottom portion 905 of power unit 955 defines an interior battery compartment 907. Additionally, power unit 955 carries a coupling mechanism 959 to allow coupling between power unit 955 and a pole portion 919 of umbrella apparatus 901, pole portion 919 being adapted at an upper end 911, preferably with threads 913, to releasably receive power unit 955. A top cap 915 hingedly connects pole portion 919 to a canopy 917. The electrical components of umbrella apparatus 901 are entirely independent of any household electrical system. The power source, such as power sources 50, 150, and 250, carried by power unit 955 is utilized to energize cooling system 921. During daylight hours, solar energy is collected by solar panel 957 and is converted and utilized to recharge the rechargeable power source which is maintained within battery compartment 907.

Cooling system 921 is coupled at a desired location underneath canopy 917 to provide a cooling mist in the area surrounding umbrella apparatus 901. Cooling system 921 is conductively coupled to power unit 955 by wiring 909 that passes through the hollow interior of pole portion 919. Cooling system 921 is a misting system comprising a reservoir 925, or other water source, a pump 927, water feed lines 929, and mist nozzles 923. Pump 927 pressurizes and pumps the water from reservoir 925 through water feed lines 929 and out of mist nozzles 923, which are located at selected spaced intervals under canopy 917, at a selected flow rate. Reservoir 925 may be a conventional ice cooler, such that the mist is chilled water.

Referring now specifically to FIG. 9 in the drawings, an umbrella apparatus 1001 is illustrated. As is shown, a power unit 1055 is utilized to provide electrical power to an automated opening and closing system 1050. Power unit 1055 includes a solar collector 1027 at its uppermost portion. Solar collector 1027 is preferably carried by a top portion 1003 of power unit 1055. A bottom portion 1005 of power unit 1055 defines an interior battery compartment 1007. Additionally, power unit 1055 carries a coupling mechanism 1029 to allow coupling between power unit 1055 and a pole portion 1019 of umbrella apparatus 1001, pole portion 1019 being adapted at an upper end 1011, preferably with threads 1013, to releasably receive power unit 1055. A top cap 1015 hingedly connects pole portion 1019 to a canopy 1017. The electrical components of umbrella apparatus 1001 are entirely independent of any household electrical system. Automated opening and closing system 1050 is conductively coupled to power unit 1055 by wiring 1009 that passes through the hollow interior of pole portion 1019. The power source, such as power sources 50, 150, and 250, carried by power unit 1055 is utilized to energize automated opening and closing system 1050. During daylight hours, solar energy is collected by solar panel 1027 and is converted and utilized to recharge the rechargeable power source which is maintained within battery compartment 1007.

Automated opening and closing system 1050 is carried at the uppermost portion of pole portion 1019. Opening and closing system 1050 includes a motor 1021, a transmission 1023, a line winding shaft 1025, a pulley system 1031, and a cable system 1033. These components cooperate to open and close the umbrella in response to the receipt of a command signal. The command signal may be supplied by the actuation of a switch (see FIGS. 1-3) carried on pole portion 1019, or it may be a wireless signal received from a paired transmitter receiver system (see FIG. 5B).

Figure 10:
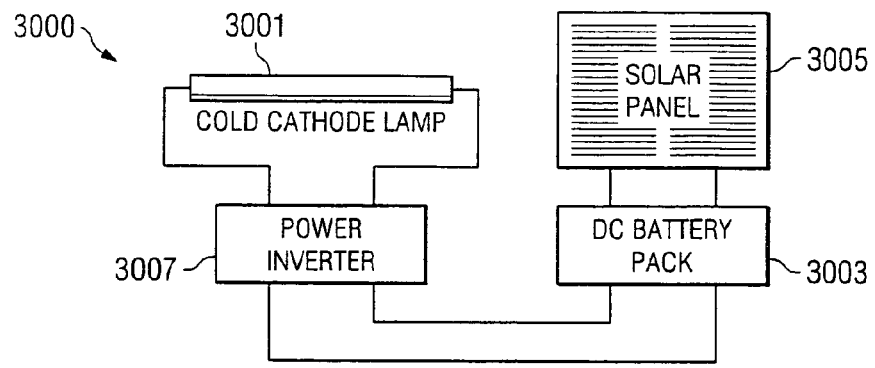
FIG. 10 is a schematic of one broad implementation of the present invention.

Referring now to FIG. 10 in the drawings, a schematic of the cold cathode tube lighting system of the present invention is illustrated. The invention is to utilize in combination a cold cathode lamp, a power inverter which supplies alternating current to the cold cathode lamp, a rechargeable DC battery pack, and a solar collector. This is depicted in simplified form in FIG. 10. This may be utilized in any outdoor application in which there is no easy or convenient access to household power. The system is entirely self-contained and does not require any household power for operation, or charging. As is shown, the cold cathode tube lighting system 3000 includes a cold cathode lamp 3001 that is supplied with AC power from a power inverter 3007. A DC battery pack 3003 includes rechargeable batteries that supply DC current to power inverter 3007. A solar collector 3005 is provided to recharge the batteries contained within DC power pack 3003.

A cold cathode tube is a lamp that produces light by the passage of an electric current through a vapor or gas maintained within a tube. A cold cathode tube does not require any heating above ambient temperature to produce light. The tube is phosphor coated on its inner surface, and thus may emit various colored light. In most cases, cold cathode tube lamps are low-pressure mercury vapor lamps. Such lamps use a 253.7 nanometer ultraviolet emission from mercury vapor excited by an electrical discharge through the lamp to charge the phosphors maintained on the wall of the lamp.

The optimum operating temperature for cold cathode tube is approximately 40 degrees Celsius, although Applicant believes that these lamps can be produced in a manner to reliably provide outdoor lighting in temperatures as cold as 15 degrees Fahrenheit. While the cold cathode tube does not require heating, the output of the lamp does vary based upon the ambient temperature. At room temperature, the initial output of a lamp is only about seventy percent of its steady state value at 40 degrees Celsius. In contrast, its output is only 25 percent when the lamp is started at zero degrees Celsius. Cold starts do require additional voltage from the power source to ensure reliable operation. However, the number of lamp "starts" has no adverse effect on the lamp. This is not true for fluorescent lamps, which degrade over time due to the number of "starts." Cold cathode tubes may be utilized to supply a white light output.

In the preferred embodiment, a cold cathode tube manufactured by Nanjing Lampus Electronics Company, Ltd. is utilized. Specifically, a lamp type CFL-20 is utilized. This has an inner diameter of 1.5 millimeters. The tube length is variable, and may be anywhere in the range of 50 millimeters to 30 millimeters in overall length. The tube is adapted to operate on four milliamps of tube current. The tube voltage is in the range of 200 to 750 Volts. The average brightness of this particular tube is 40,000 cd/m$^2$.

Another advantage of cold cathode tubes is that the tubes can be very thin in diameter. For example, in the preferred implementation, the cold cathode tube may be one or two millimeters in diameter. A cold cathode tube can be bent into any shape and can be formed in very long lengths, such as several feet long. Thus, cold cathode tubes provide greater light output per foot versus conventional lighting.

Another significant advantage of cold cathode tubes it that they have relatively long lamp life. It is not unusual to have lamp lives which are thirty to forty thousand hours of use. In other words, these cold cathode tubes have, for all practical purposes, an infinite life span.

They are low power devices. They do not generate a lot of heat. They provide high lumen output. For these reasons, fewer batteries are needed to drive the cold cathode ray tube, and smaller solar cell panels may be utilized to recharge the batteries. In other words, relatively small form factors can be achieved because the solar cells, the batteries, and the bulbs can be relatively small in size.

The present invention can be implemented on a small, medium, or large scale so the solar cell panels and batteries may be moved up in size to either provide greater light output or to provide for a longer useful life.

Additionally, the present invention may be considered to satisfy three separate and distinct outdoor lighting applications, all of which may be incorporated into the umbrella apparatus of the present invention.

The first application is that of a "special purpose light," or "task light," such as for security applications. These special purpose lights would provide very light output, for a relatively short duration. One example would be the utilization of the cold cathode ray tube to provide extremely high light output for a very small area for a very short time, all in response to detection of motion in a particular area. For example, a system can be configured to detect motion in a doorway, motion in a yard, motion in a driveway, or the like. The brightness can be provided which can be far in excess of 40,000 cd/m$^2$. For example, 100,000 to 200,000 cd/m$^2$ may be provided for a very small area for a very short duration. For example, the duration may be a few minutes to ten minutes.

The second application requires a medium amount of light output, but requires longer periods of operation or wider areas of coverage. For example, the light assembly provided with the umbrella provides a relatively high light output, such as in the range of 20,000 to 100,000 cd/m$^2$, in order to allow one to read, play games, operate a computer, or do needlework under the umbrella. Preferably, the battery pack and associated solar panel is sufficient to allow the system to operate continuously for a time interval in the range of 8-12 hours. Additionally, and preferably, the solar panel should be of the size and output which is sufficient to fully recharge the battery pack during the daylight hours.

A third application requires a lower level of light intensity. A good example would be lawn, patio, walkway, or landscape lighting. One does not ordinarily expect to be able to read or do intricate work under this type of lighting. In contrast, all that is expected is that a reasonable amount of light be provided to allow one to walk safely through an area. This type of task may require brightness in the range of 6,000 cd/m$^2$ to 60,000 cd/m$^2$.

Figure 11:
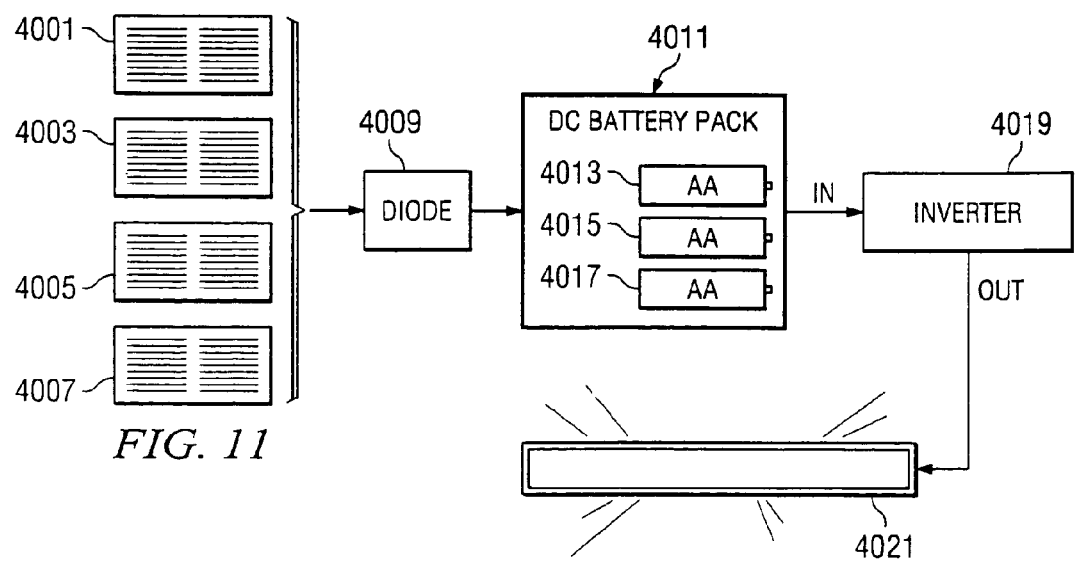
FIG. 11 is a block diagram representation of the present invention.

Referring now to FIG. 11 in the drawings, a block diagram representation of the application of the present invention to a lawn lighting scenario is illustrated. In this scenario, a plurality of solar panels 4001, 4003, 4005, and 4007 are connected together in series. Preferably, solar panels 4001, 4003, 4005, and 4007 are manufactured by Siemens and comprise monocrystal solar panels, each providing 1.5 Volts. The total current for the array of solar panels is about 80 milliamps. The current from solar panels 4001, 4003, 4005, and 4007 is passed through a diode 4009 and then to a battery pack 4011. Battery pack 4011 includes a plurality of batteries 4013, 4015, and 4017, for example three AA batteries. In alternative embodiments, as few as two batteries may be used. As is shown, each battery is a 1.2 Volt Nickel Cadmium battery. They collectively provide 700 milliamp hours of power.

The output of DC battery pack 4011 is provided as an input to an inverter 4019. Inverter 4019 receives 4.8 Volts DC in and produces as an output of 800 Volts rms AC at 40 Hertz. The total current of the output is 4-6 milliamps.

This is provided to the cathode of a cold cathode ray tube lamp 4021. The current passes through the vapor maintained within cold cathode ray tube lamp 4021 and causes electrons to be stripped from the gas. These electrons collide with the phosphorus coating on the interior surface of cold cathode ray tube lamp 4021, thereby emitting light.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the scope of the invention.

What is claimed is:

1. An umbrella apparatus comprising:
   a pole portion;
   an umbrella portion hingedly coupled to the pole portion, the umbrella portion having a plurality of radially extending rib members;
   a rechargeable electrical power system for providing electrical power to the umbrella apparatus;
   a solar energy system coupled to the pole portion, the solar energy system being adapted to collect solar energy and convert the solar energy into electrical energy, the solar energy system being conductively coupled to the rechargeable electrical power system, such that the solar energy collected and converted into electrical energy recharges the rechargeable electrical power system;
   a lighting system having a plurality of light emitting diodes conductively coupled to the rechargeable electrical power system, the light emitting diodes being recessed within the rib members; and
   translucent materials disposed over the light emitting diodes for enhancing the light from the light emitting diodes.

2. The umbrella apparatus according to claim 1, wherein the translucent materials are smooth.

3. The umbrella apparatus according to claim 1, wherein the translucent materials are textured.

4. The umbrella apparatus according to claim 1, wherein the translucent materials extend beyond the exterior surfaces of the rib members.

5. The umbrella apparatus according to claim 1, further comprising:
   conductors carried within the rib members for conductively coupling the light emitting diodes to the rechargeable electrical power system.

6. The umbrella apparatus according to claim 1, wherein the solar energy system is releasably coupled to the rechargeable electrical power system.

7. The umbrella apparatus according to claim 1, further comprising:
   a top cap for hingedly connecting the umbrella portion to the pole portion;
   wherein the rechargeable electrical power system is releasably coupled to the top cap.

8. The umbrella apparatus according to claim 1, wherein the solar energy system and the rechargeable electrical power system are disposed in separate housings.

9. The umbrella apparatus according to claim 1, wherein the rechargeable electrical power system comprises:
   at least one rechargeable battery disposed in a housing that surrounds the pole portion.

10. The umbrella apparatus according to claim 9, further comprising:
   a power system charger conductively coupled to the at least one rechargeable battery;
   a detachable transformer for converting AC electrical power to DC electrical power, the transformer being releasably coupled to the power system charger, thereby allowing the power system charger to use AC power to recharge the at least one rechargeable battery when the transformer is conductively coupled to the power system charger.

\* \* \* \* \*